United States Patent [19]

Mahn, Jr.

[11] Patent Number: 5,665,458

[45] Date of Patent: Sep. 9, 1997

[54] HEAT ACTIVATED APPLIQUE ON PRESSURE SENSITIVE RELEASE PAPER AND METHOD OF MAKING

[75] Inventor: John Mahn, Jr., Cincinnati, Ohio

[73] Assignee: Specialty Adhesive Film Co., Cleves, Ohio

[21] Appl. No.: 554,315

[22] Filed: Nov. 8, 1995

Related U.S. Application Data

[62] Division of Ser. No. 227,636, Apr. 14, 1994, Pat. No. 5,422,447.

[51] Int. Cl.⁶ ........................................... B32B 3/00
[52] U.S. Cl. ........................ 428/202; 428/200; 428/90; 428/79; 428/201; 428/488.4; 428/914
[58] Field of Search ............................ 428/216, 200, 428/347, 480, 375, 423.7, 913, 90, 79, 92, 214, 914, 475.2, 521, 202, 488.4

[56] References Cited

U.S. PATENT DOCUMENTS

| | | | |
|---|---|---|---|
| 4,021,591 | 5/1977 | DeVries et al. | 428/200 |
| 4,269,885 | 5/1981 | Mahn | 428/216 |
| 4,390,387 | 6/1983 | Mahn | 428/90 |
| 4,610,904 | 9/1986 | Mahn, Sr. et al. | 428/79 |
| 4,685,984 | 8/1987 | Powers et al. | 156/155 |
| 4,786,349 | 11/1988 | Mahns, Sr. | 156/234 |
| 4,971,644 | 11/1990 | Mahn, Sr. et al. | 156/253 |
| 5,133,819 | 7/1992 | Croner | 156/230 |
| 5,149,589 | 9/1992 | Naritomi et al. | 428/412 |
| 5,411,783 | 5/1995 | Mahr, Jr. | 428/79 |

*Primary Examiner*—Merrick Dixon
*Attorney, Agent, or Firm*—Wood, Herron & Evans, L.L.P.

[57] ABSTRACT

A heat activated applique is formed by forming a heat activated laminate. The heat activated laminate includes, for example, a thermoplastic layer bonded to an indicia-bearing layer such as a pigmented polymeric film or twill. This indicia-bearing layer is bonded to a support layer by a pressure sensitive adhesive. The pressure sensitive adhesive has a preferential adhesion to the support layer. The applique is formed by cutting through the heat activated laminate but not through the support layer to thereby form the desired ornamental applique. Waste portions are separated while the applique itself remains attached to the support layer bonded by the pressure sensitive adhesive. This is then bonded to a substrate while still attached to the support layer by applying heat and pressure through the support layer against the heat activated applique and against a cloth substrate. This allows creation of very unique heat activated appliques and also provides for application of these appliques to a substrate with all the individual elements of the applique properly aligned, even if those elements are not physically connected to each other.

5 Claims, 1 Drawing Sheet

U.S. Patent  Sep. 9, 1997  5,665,458
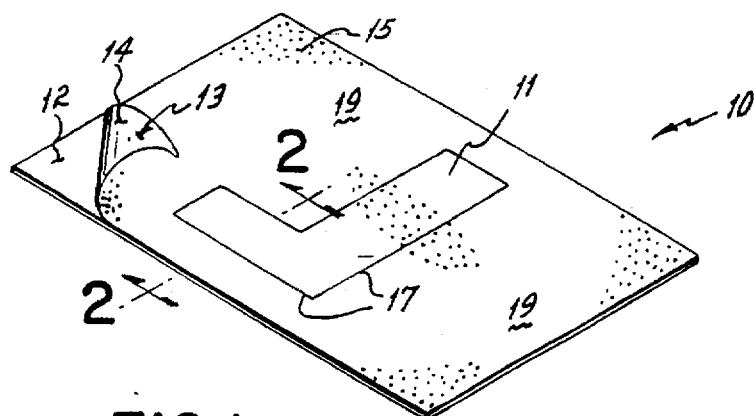
FIG. 1
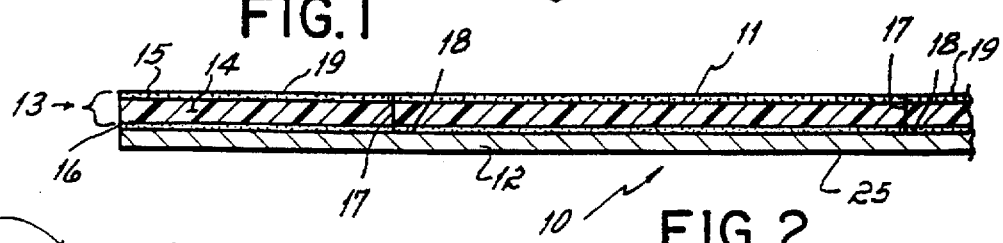
FIG. 2
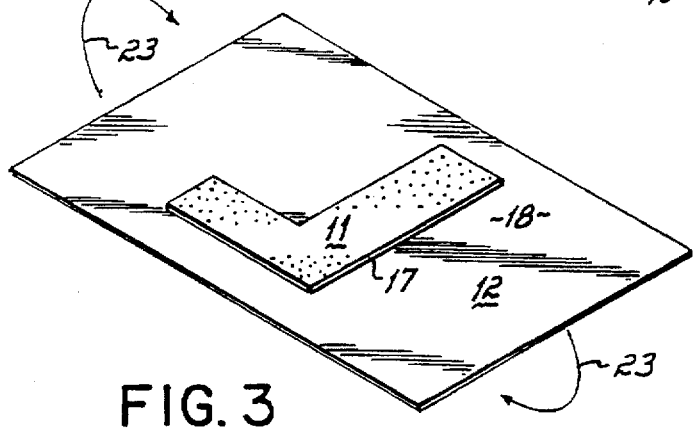
FIG. 3
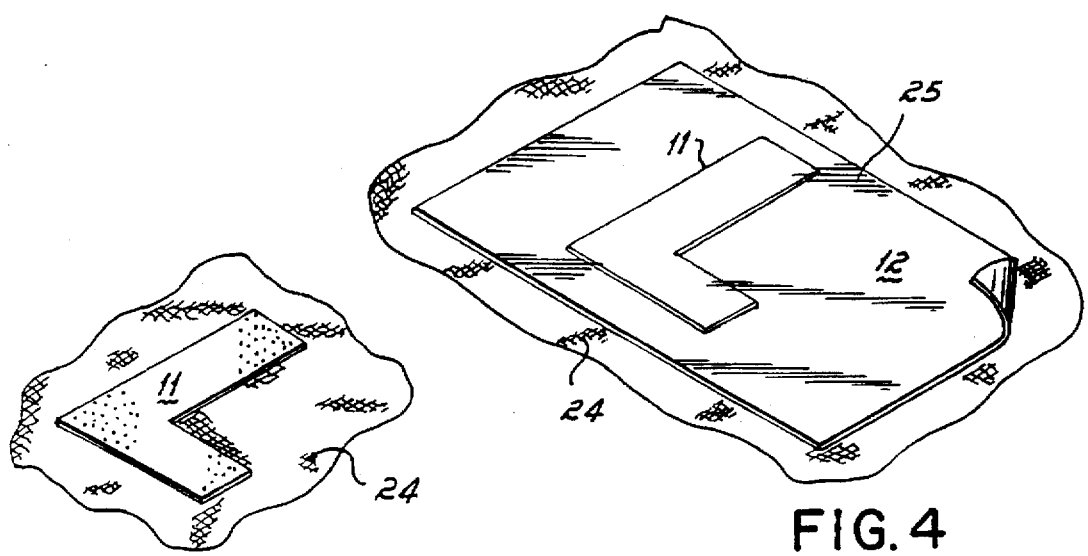
FIG. 4
FIG. 5

HEAT ACTIVATED APPLIQUE ON PRESSURE SENSITIVE RELEASE PAPER AND METHOD OF MAKING

This application is a divisional of application Ser. No. 08/227,636, filed Apr. 14, 1994, U.S. Pat. No. 5,422,447.

BACKGROUND OF THE INVENTION

Heat activated transfers and appliques are used to apply a variety of different indicia onto a variety of different substrates. The particular indicia can be a company logo, a person's name, lettering or numerals on sports jerseys and the like, as well as purely ornamental designs such as licensed characters.

Particularly when applying these to a cloth substrate, there are a number of critical criteria for a heat activated applique. One criteria is the ease and accuracy of creating designs, particularly intricate designs. A second critical criteria is the appropriate location of the applique onto the substrate, i.e., a shirt, hat or the like. This is particularly a concern when there are a series of letters, numerals or other symbols which are separate and discrete which must be applied at a relatively precise location.

There are a number of methods used to arrange a series of indicia and locate these on a substrate. With large numerals and letters such as names and jersey numbers, these can be physically placed onto the back of a shirt, for example, using a template or other guide. This is a relatively good method for very large indicia.

With smaller indicia, screen printing is possible. This has several inherent limitations and in many situations is undesirable. Screen printing is particularly unsuitable for making a single applique.

SUMMARY OF THE INVENTION

The present invention is premised on a realization that a heat activated applique can be formed by initially forming a sheet which includes a support layer and a heat activated laminate bonded to the support layer with a pressure sensitive adhesive. An applique is formed by cutting through the heat activated laminate and not through the support layer. The cut line separates the applique from unwanted waste material. The waste material is then separated, leaving the applique reverse-formed on the support layer. The applique can then be placed in position on a substrate to be marked and heat and pressure applied through the support sheet causing the heat activated applique to bond to the substrate.

The method of the present invention can be used to form appliques having relatively complex designs having multiple characters or logos with peripheral applique portions surrounding void areas, script letters or a plurality of discrete letters, numerals or other symbols.

In a preferred application, the heat activated laminate has a lower layer which is a thermoplastic elastomer and an upper layer which is a thermoplastic adhesive layer.

Preferably, the support layer is a transparent or translucent material which permits the viewing of the applique when placed upon a cloth substrate or the like.

Objects and advantages of the present invention will be further appreciated in light of the following detailed description and drawings in which:

BRIEF DESCRIPTION OF THE DRAWINGS

FIG. 1 is a perspective view of an applique being formed according to the method of the present invention.

FIG. 2 is a cross-sectional view taken at lines 2—2 of FIG. 1.

FIG. 3 is a perspective view of the completed applique of the present invention.

FIG. 4 is a perspective view of an applique made in accordance with the present invention being applied to a cloth substrate.

FIG. 5 is a perspective view of an applique applied to a cloth substrate.

DETAILED DESCRIPTION

With reference to the figures, there is a sheet 10 which supports an applique 11 shown in this drawing as simply the letter "L." In practice, this would generally be more intricate, possibly having a plurality of discrete and separate symbols. The sheet further includes a lower support sheet 12 which is covered with a continuous heat activated laminate 13.

The heat activated laminate 13 includes at least two layers. The lower layer 14 is an indicia layer and the upper layer 15 (as shown in FIG. 1) is a heat activated adhesive layer. The indicia layer 14, in turn, is bonded to support layer 12 by a pressure sensitive adhesive layer 16.

The applique includes a peripheral edge 17 which is a cut line. Cut line 17 extends from the heat activated adhesive layer 15 down to an upper surface 18 of support layer 12. The cut line extends completely around the peripheral edge of the applique 11 and separates the applique 11 from waste portions 19 of laminate 13.

To form the applique of the present invention, the support layer 12 is coated with the pressure sensitive adhesive layer 16 and the heat activated laminate 13, in turn, is laminated to the support layer 12. Laminate 13 can either be applied one layer at a time upon the support layer 12, or preferably is preformed with the heat activated adhesive layer 15 bonded to the indicia layer 14 and subsequently laminated to the support layer 12. This, of course, will vary, depending upon the particular indicia layer applied. This forms the continuous sheet 10.

The cut line 17 is then formed through the heat activated adhesive layer 15 down to the upper surface 18 of the support 12. This cut can be made using a variety of different equipment. This can be die cut or can be formed using a variety of well-known different computer-activated cutters. Such cutters are manufactured and sold by Graphtec, Roland and Ioline.

As shown in FIG. 1, after the cut line as been formed, the waste material 19 is then pulled and separated from the support sheet 12, leaving only the applique 11 on the support sheet, as shown in FIG. 3. The applique 11, as formed on the sheet, is actually the reverse of the desired image. As shown by arrows 23, the support sheet and the applique is then inverted and placed on a cloth substrate 24, as shown in FIG. 4. Heat and pressure are then applied to the back side 25 of support layer 12 at a high enough temperature and pressure to activate or melt the heat activated adhesive layer 1 causing it to penetrate into the cloth surface 24. Upon cooling, the applique 11 bonds to the surface 24. The support 12 can be almost immediately separated from the applique which is now adhered to the cloth surface.

The indicia layer can be formed from a variety of different thermoplastic and thermoset materials. Generally, it will be opaque and used to provide indicia such as letters, numbers or other symbols. It can, for example, be a polyvinyl chloride plastisol layer such as disclosed in Liebe U.S. Pat.

No. 3,660,210, a flocked material such as disclosed in Mahn U.S. Pat. No. 4,390,387, or a thermoset material such as Mahn U.S. Pat. No. 4,610,904. Other materials are disclosed in Mahn U.S. Pat. No. 4,786,349 and Mahn U.S. Pat. No. 4,269,885.

Basically, the indicia-bearing layer must, of course, provide the appropriate indicia such as color and it, in addition, must withstand application temperatures. Therefore, generally it will be a thermoset material or a high temperature thermoplastic, twill or flock. In addition, it can be a puff ink material. Suitable materials include thermoset and thermoplastic polyurethanes and polyesters, high-temperature polyolefins, polyepoxides, and high-temperature and thermoset polyesters. One particular layer that can be used in the present invention is a thermoset polyurethane sold as Zephyrlon by Sinclair and Valentine Chemical Coatings Group of Wheelabrator Frye of North Kansas City, Mo.

Thermoplastic elastomers are particularly useful materials which possess, at normal temperatures, the characteristic resilience and recovery from extension of cross-linked elastomers, but which exhibit plastic flow at elevated temperatures and can be fabricated by the usual techniques applied to thermoplastics. Particular thermoplastic elastomers include styrenic thermoplastic elastomers, polyolefin thermoplastic elastomers, thermoplastic polyurethane elastomer including polyester urethane, polyether urethane and caproester-urethane, polyester thermoplastic elastomer, polyamide thermoplastic elastomer, and thermoplastic polybutadiene, ethylene vinyl acetate copolymer thermoplastic, thermoplastic PVC/nitrile rubber, thermoplastic fluorocarbon elastomer, thermoplastic chlorinated polyethylene elastomer and thermoplastic styrene butadiene rubber. These should be formulated to provide a soft hand feel.

Generally, for use in the present invention, a softer grade of thermoplastic elastomer is preferred. Basically, the thermoplastic elastomer should have a flexibility at the applied thickness which is about the same as the cloth substrate to which it is bonded. Generally, a durometer of 50–80 A or softer will suffice for use in the present invention, although in applying lettering to more rigid substrates such as hats, shoes and the like, for example, a more rigid, harder material can be used.

Film thickness for all the upper indicia layers will vary, depending upon the selection of the particular indicia. The film thickness for the thermoplastic elastomer layer should be from about 3–15 mils, and preferably about 5–7 mils with 5 mils being preferred. The preferred thermoplastic elastomer for use in the present invention should have a melting temperature of 250° F. up to about 400° F. and preferably around 300° F. This, of course, can vary widely, depending on the particular application. One particular thermoplastic elastomer which is suitable for the present invention is Chemigum Brand TPE 02055 manufactured by Goodyear Chemical. This is a PVC nitrile-based thermoplastic elastomer having a melting temperature of about 300° F.

If desired, this can be combined with about 5 to about 20% polyester thermoplastic resin or polyurethane thermoplastic resin to improve processing characteristics. This material is pigmented by blending in about 3% by weight of a compatible pigment such as pigments sold by Americhem as well as Harwick Chemical.

The heat activated adhesive layer can be formed from a wide variety of different materials. This, of course, would be partially dependent on the selection of the indicia-bearing layer. Suitable adhesive layers include polyester adhesives such as Bostik Polyester Adhesive, polyurethane adhesives such as Morton PS 62, as well as mixtures of polyester and polyurethane thermoplastic adhesives. Also suitable are acrylic cross-linking adhesives such as Rohm & Haas Rhoplex LE 1126 or Rhoplex K87. Such adhesives are disclosed in U.S. Pat. Nos. 4,390,387, 4,269,885, 4,610,904, and 4,786,349.

Generally, the adhesive must be compatible with both the substrate and the indicia layer. The adhesives discussed are exemplary of those suitable for use in these applications. It is preferable to preform the laminate 13, i.e., the adhesive layer bonded to the indicia layer. This laminate 13 can then be easily laminated to the support layer 12. Selection of the appropriate support layer 12 and the pressure sensitive adhesive 16 is, in part, dependent upon the indicia layer selected. The support layer must be a relatively strong material which will not be penetrated by the cutting device used to form the applique. Densified Kraft paper is suitable for most applications. Mylar film is also suitable for use in most applications. The pressure sensitive adhesive must be one which has a preferred adhesion to the support layer, as opposed to the indicia layer, at application temperature and which permits easy removal of waste portions. When the indicia layer is a polymeric film such as a thermoplastic elastomer, a pressure sensitive adhesive such as Cold Seal Brand sold by Innovation Converters of Fairfield, Ohio will function being applied at approximately ½ mil. Although the application thickness is not critical, it is preferable to minimize it. With a flock indicia layer, the pressure sensitive adhesive should be a thinner film applied using, for example, a solvent-based pressure sensitive adhesive onto a mylar film. This helps the pressure sensitive adhesive adhere to the mylar film.

Thus, as described, the sheet 10 of the present invention is simply formed by forming the laminate of the pressure sensitive adhesive bonded to the indicia layer. A separate laminate is formed by coating the support layer with the pressure sensitive adhesive layer. The indicia layer is then bonded to the pressure sensitive adhesive by running it through compression rollers. The applique is cut from the heat activated laminate using a computer operated knife or cutting edge or alternatively running it between cutting rollers or dies. The waste material can then be separated from the support layer either manually or by holding down the indicia and using suction to remove the waste material.

The applique is pressed against the cloth substrate with the support layer still attached and heat and pressure is applied directly to the support to activate the heat activated adhesive, causing the adhesive to bond to the substrate. If the indicia layer is a puff ink, this will, in turn, cause the puff ink to expand.

The application pressure, temperature and time will vary widely, depending upon the particular adhesive used. The application temperature can vary from about 200° F. up to 350° F. or more. The application pressure can be relatively low, i.e. 10 psi to about 30 psi. Again, the application time can vary from 1 to 15 seconds or more, depending upon the particular material.

The present invention is particularly useful in creating unique designs using a computer-operated cutting apparatus. These designs can be relatively intricate, having peripheral edges surrounding void spaces (such as the hollow portion of a zero). Thus, extremely intricate and unique appliques can be designed and easily attached to a cloth substrate with all the integral individual indicia properly aligned. One particular benefit of the present invention is ability to attach appliques having a plurality of symbols which are totally separate from each other. The symbols are maintained in proper alignment by the pressure sensitive adhesive on the support. In such applications the individual indicia would be cut out of a single support sheet and thus would be perfectly aligned. They can be applied at one time by applying heat and pressure over the entire support concurrently bonding the individual characters to the substrate surface. The pressure sensitive adhesive will keep the different symbols properly aligned until the heat activated transfer bonds them to the substrate surface. Further, this process is uniquely suited to the manufacture of small quantities of a particular design or even just one.

The present invention can also be used to make a multicolored applique by forming two separate apliques, one to be positioned on another. The alignment of the two is simplified because the support layer is translucent or clear. This is beneficial at any time an applique is being applied to a substrate.

Obviously, the present invention can be used in a wide variety of different applications with a wide variety of different indicia. Accordingly, the invention should only be defined by the appended claims wherein I claim:

1. A heat activated applique comprising a lower support layer;

a continuous opaque indicia-bearing layer having a first surface bonded to said support layer with a pressure sensitive adhesive;

an upper heat activated adhesive layer bonded to a second surface of said indicia-bearing layer;

cut lines through said heat activated adhesive layer and said indicia-bearing layer and not through said support layer; wherein said cut lines separate indicia-bearing portions of said applique from waste portions.

2. The heat activated applique claimed in claim 1 wherein said indicia-bearing layer comprises a layer selected from the group consisting of cloth, flock, thermoplastic elastomer, pigmented thermoset polymer, pigmented high-temperature thermoplastic film.

3. The applique claimed in claim 2 wherein said indicia-bearing layer comprises a thermoplastic elastomer layer.

4. The applique claimed in claim 1 wherein said support layer is transparent.

5. A method of forming a heat activated applique comprising:

bonding a continuous heat activated laminate to a support layer wherein said heat activated laminate includes a lower opaque indicia layer bonded to said support layer, said laminate further including an upper heat activated adhesive layer;

cutting said laminate without cutting through said support layer to define said applique and removing waste portions of said laminate.

* * * * *

(12) EX PARTE REEXAMINATION CERTIFICATE (9951st)
United States Patent
Mahn, Jr.

(10) Number: US 5,665,458 C1
(45) Certificate Issued: Nov. 21, 2013

(54) HEAT ACTIVATED APPLIQUE ON PRESSURE SENSITIVE RELEASE PAPER AND METHOD OF MAKING

(75) Inventor: John Mahn, Jr., Cincinnati, OH (US)

(73) Assignee: Specialty Adhesive Film Co., Cleves, OH (US)

Reexamination Request:
No. 90/012,502, Sep. 12, 2012

Reexamination Certificate for:
Patent No.: 5,665,458
Issued: Sep. 9, 1997
Appl. No.: 08/554,315
Filed: Nov. 8, 1995

Related U.S. Application Data

(62) Division of application No. 08/227,636, filed on Apr. 14, 1994, now Pat. No. 5,422,447.

(51) Int. Cl.
*B32B 7/12* (2006.01)
*B44C 1/17* (2006.01)
*B44C 1/16* (2006.01)
*D06Q 1/00* (2006.01)

(52) U.S. Cl.
CPC . *B32B 7/12* (2013.01); *B44C 1/162* (2013.01); *B44C 1/1716* (2013.01); *D06Q 1/00* (2013.01); *Y10S 428/914* (2013.01)
USPC ............... 428/202; 428/79; 428/90; 428/200; 428/201; 428/914; 428/488.41

(58) Field of Classification Search
None
See application file for complete search history.

(56) References Cited

To view the complete listing of prior art documents cited during the proceeding for Reexamination Control Number 90/012,502, please refer to the USPTO's public Patent Application Information Retrieval (PAIR) system under the Display References tab.

*Primary Examiner* — Norca L Torres Velazquez

(57) ABSTRACT

A heat activated applique is formed by forming a heat activated laminate. The heat activated laminate includes, for example, a thermoplastic layer bonded to an indicia-bearing layer such as a pigmented polymeric film or twill. This indicia-bearing layer is bonded to a support layer by a pressure sensitive adhesive. The pressure sensitive adhesive has a preferential adhesion to the support layer. The applique is formed by cutting through the heat activated laminate but not through the support layer to thereby form the desired ornamental applique. Waste portions are separated while the applique itself remains attached to the support layer bonded by the pressure sensitive adhesive. This is then bonded to a substrate while still attached to the support layer by applying heat and pressure through the support layer against the heat activated applique and against a cloth substrate. This allows creation of very unique heat activated appliques and also provides for application of these appliques to a substrate with all the individual elements of the applique properly aligned, even if those elements are not physically connected to each other.

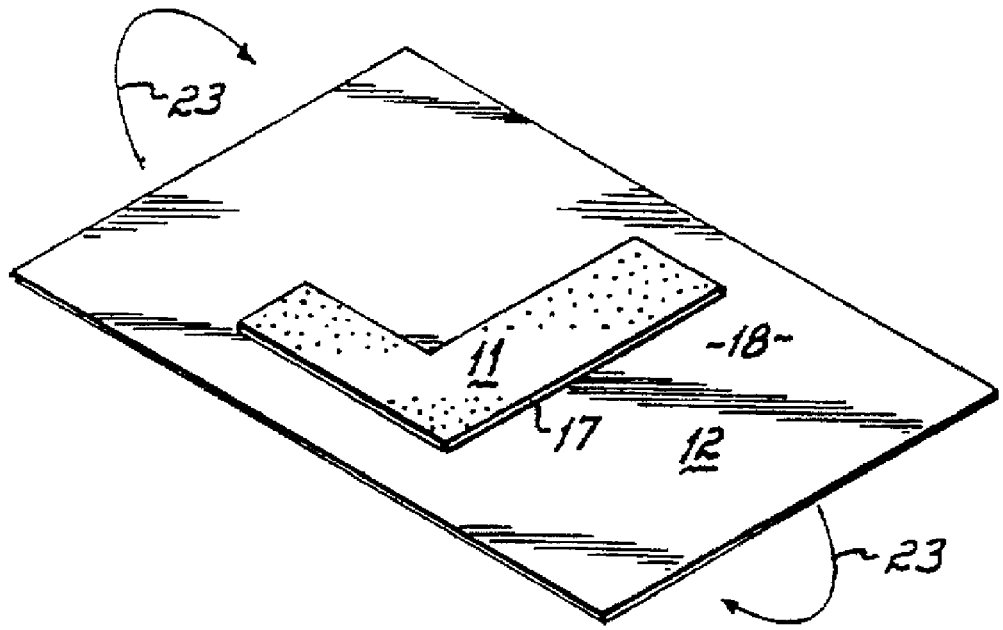

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-5 are cancelled.

* * * * *